US005148196A

United States Patent [19]

Spector

[11] Patent Number: 5,148,196

[45] Date of Patent: Sep. 15, 1992

[54] SYSTEM FOR CREATING CUSTOM-MADE MINIATURES

[76] Inventor: Donald Spector, 380 Mountain Dr., Union City, N.J. 07087

[21] Appl. No.: 711,207

[22] Filed: Jun. 6, 1991

[51] Int. Cl.$^5$ .............................................. G03B 41/00

[52] U.S. Cl. ...................................... 354/75; 354/354; 355/20

[58] Field of Search ....................... 354/75, 76, 77, 78, 354/79, 354; 355/20

[56] References Cited

U.S. PATENT DOCUMENTS 4,521,104 6/1985 Craig ................................ 354/76 X

*Primary Examiner*—Michael L. Gellner
*Attorney, Agent, or Firm*—Michael Ebert

[57] ABSTRACT

A system for converting a printable sheet of heat-shrinkable, synthetic plastic film material into a custom-made miniature having an image thereon of a selected individual. In this system, the face or figure of the selected individual is viewed by a video camera whose output signal is applied to a high-resolution TV monitor, on the screen of which is exhibited an image of the individual. The image is transferred from the monitor to an associated printer which impresses the image on the sheet in a scale appropriate to its dimensions. The sheet is then subjected to an elevated temperature, causing the sheet to shrink uniformly, and in doing so to markedly reduce the scale of the image thereon, thereby creating on a relatively thick substrate the desired miniature.

7 Claims, 2 Drawing Sheets

Fig. 1.
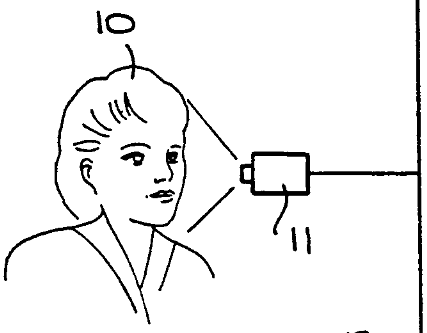
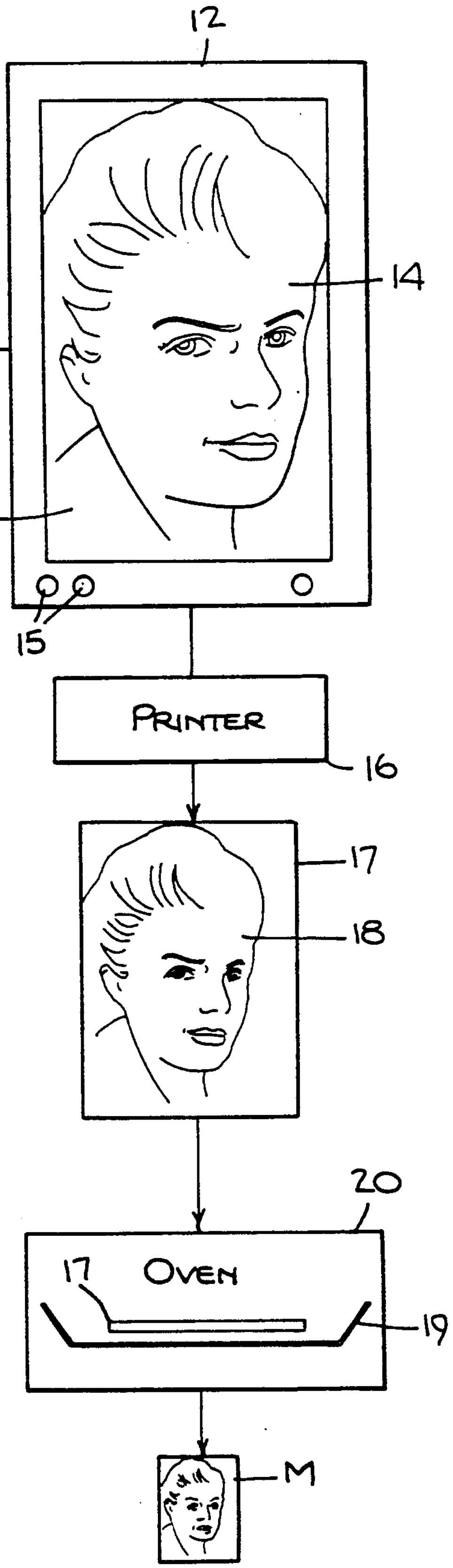
Fig. 3.
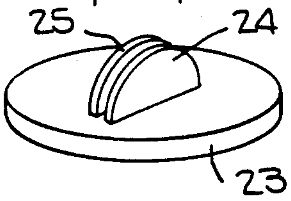
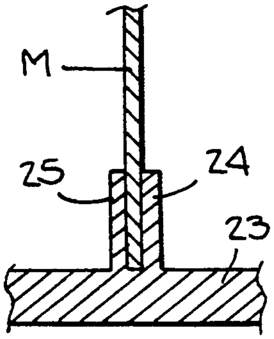
Fig. 4.
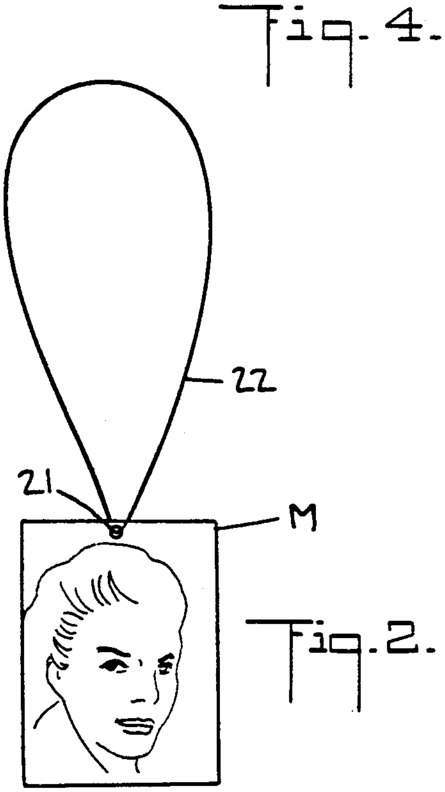
Fig. 2.

SYSTEM FOR CREATING CUSTOM-MADE MINIATURES

BACKGROUND OF INVENTION

1. Field of Invention

This invention relates generally to miniatures, and more particularly to a system for converting a printable sheet of heat-shrinkable synthetic plastic film material into a custom-made miniature having an image thereon of a selected individual.

2. Status of Prior Art

In the field of fine arts, a miniature generally refers to a diminutive portrait of an individual, usually executed in a precise style so that despite the small scale of the portrait, the features of the individual are sharply defined. In colonial America, such great artists as C. W. Peale and Copley were notable exponents of this art. Miniatures have also been executed in oil on copper plate in baked enamel. For a miniature to be viewed, it must be handled, and it is therefore desirable to create a miniature on a substrate that can survive repeated handling.

Long before the invention of photography, it was the common practice for ladies of fashion to carry a locket suspended from a neck chain, the locket encasing a painted miniature of an individual for whom the wearer had a strong affection. The art of painting miniatures, which goes back many centuries, is no longer practical to any significant degree, for if one wishes a miniature of a loved one, this could be produced by optically-reducing a large photograph of the individual to the scale of a microfilm frame.

Yet in a sense, the art of producing miniatures survives in a form which exhibits the shrink characteristics of certain heat-sensitive synthetic plastic film materials. Thus a high popular craft toy is known as SHRINKY DINKS. A craft toy for children is one that requires the child to exercise some degree of manual or artistic skill in playing with the toy. Hence craft toys have educational as well as entertainment value.

In a SHRINKY DINKS craft toy, the child is provided with a sheet of heat-shrinkable, plastic film material on whose face is printed in black and white the outline of a character. The term "character," which ordinarily refers to a person in the cast of a drama or novel, in the field of toys and playthings is applied to a humanoid or animal-like figure that originated in a comic strip, a motion picture or a TV program, and has since acquired the status of a recognized personality. Thus Garfield, Mickey Mouse and Donald Duck are internationally known characters, as are the fanciful figures who populate the Sesame Street TV series for children.

In SHRINKY DINKS, the character whose contours are printed on the shrinkable plastic sheet is colored in by the child, using colored pencils or other means for this purpose, so that the resultant colored image represents the child's version of the character. Then the colored plastic sheet is placed in a tray that is inserted in an oven heated to an elevated temperature.

In the oven, the sheet of film material is subjected to an elevated temperature for a period of about 5 minutes. As the sheet is baked, it proceeds to twist and curl and then flatten out. The shrunken sheet of film material, which is now relatively thick, is then removed from the oven and permitted to cool and cure, preferably under the pressure of a flat piece of cardboard to maintain the form in a flat state. The resultant form is therefore a miniature of the character.

In the SHRINKY DINKS craft toy, the user is provided with a set of shrinkable sheets each having one or more different characters printed thereon, so that the user is able to produce a collection of miniatures.

The main drawback of a SHRINKY DINKS craft toy or a similar toy that makes use of a shrinkable plastic film sheet, is that the resultant miniatures are impersonal in the sense that they bear no relation to the particular child who creates them. The character whose image appears on the miniature is one chosen by the manufacturer of the toy who is licensed to reproduce the character by its owner, say, the Walt Disney Corporation.

Hence while in the past a person seeking to acquire a miniature of himself or of a loved one, would engage an artist to paint this miniature, with a SHRINKY DINKS toy, the child can only create miniatures of characters supplied to him by the manufacturer, not of himself or of an individual close to him, such as a parent, brother or sister.

SUMMARY OF INVENTION

In view of the foregoing, the main object of this invention is to provide a system for converting a printable sheet of heat-shrinkable, synthetic plastic film material into a custom-made miniature having an image thereon of a selected individual, so that the resultant miniature has a special meaning and value to the user.

A significant feature of the invention is that the miniature created by the system can be a diminutive image of the child producing the miniature or that of a relative or friend of the child or even of his pet dog or cat. The system makes it possible for the child to produce a collection of miniatures, each having a small scale image of a different individual.

More particularly, an object of the invention is to provide a system of the above type which makes use of a standard TV monitor which makes it possible for the user to see and compose the image of a selected individual before it is printed on the heat shrinkage sheet.

Also an object of the invention is to provide a system of the above type which makes it possible to create a collection of miniature play pieces, each having a different image thereon, whereby the user can engage in play activity involving individuals selected by and known to the player.

Briefly stated, these objects are attained in a system for converting a printable sheet of heat-shrinkable, synthetic plastic film material into a custom-made miniature having an image thereon of a selected individual. In this system, the face or figure of the selected individual is viewed by a video camera whose output signal is applied to a high-resolution TV monitor, on the screen of which is exhibited an image of the individual. The image is transferred from the monitor to an associated printer which impresses the image on the sheet in a scale appropriate to its dimensions. The sheet is then subjected to an elevated temperature, causing the sheet to shrink uniformly, and in doing so to markedly reduce the scale of the image thereon, thereby creating on a relatively thick substrate the desired miniature.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a block diagram of a system in accordance with the invention;

FIG. 2 illustrates a miniature produced by the system suspended from a neck chain:

FIG. 3 is a stand for a contoured miniature to form a movable play piece;

FIG. 4 shows in section a miniature mounted on the stand; and

DESCRIPTION OF INVENTION

Figure 5:
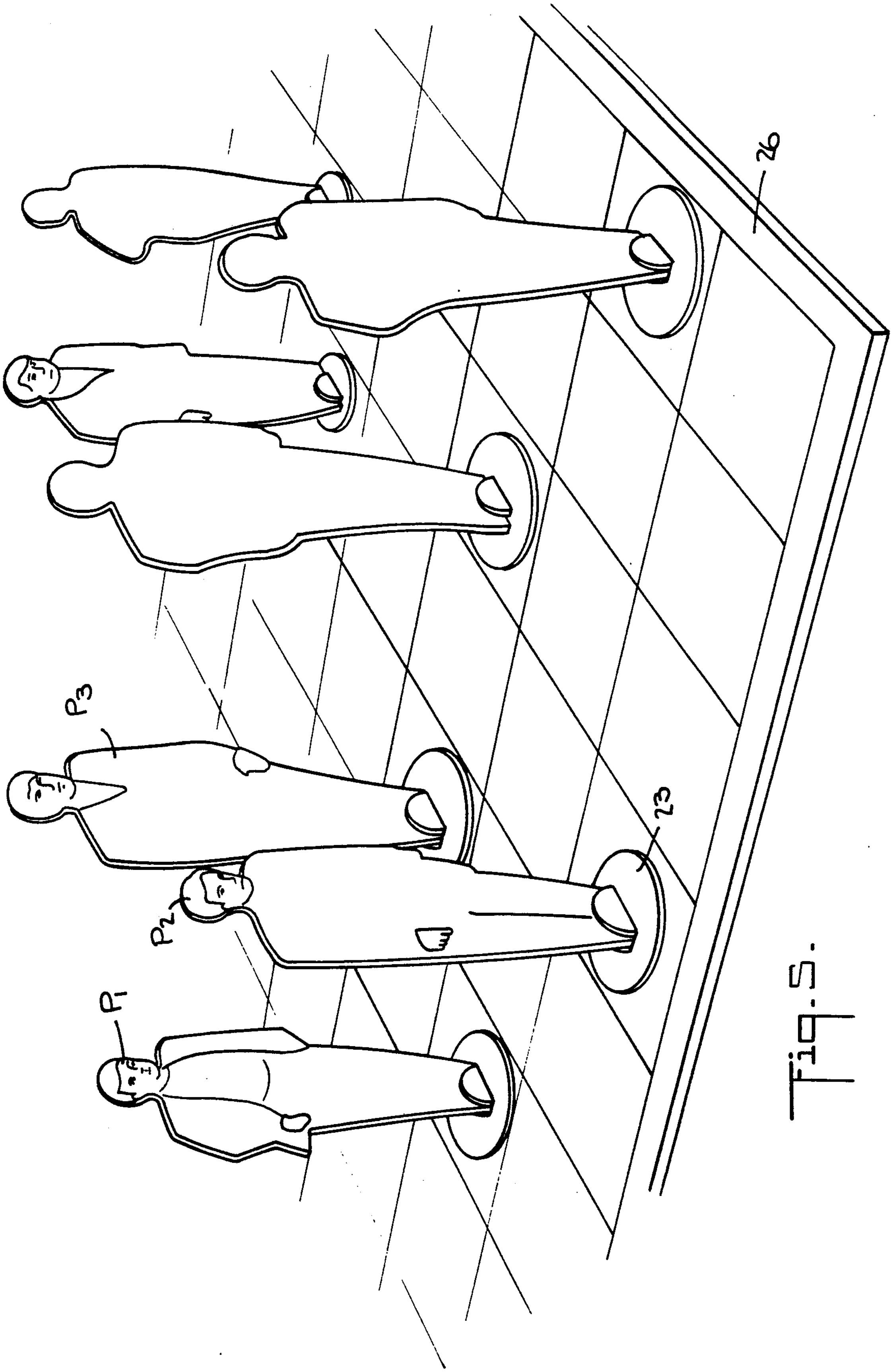
FIG. 5 illustrates a set of play pieces on a playing board.

In a system in accordance with the invention, as shown in FIG. 1, an image of a selected individual 10, which may be the child who produces the miniature or anyone known to the child, such as his brother, sister, parent, cousins, friends, or even the child's pet dog or cat, is first produced in a scale that is appropriate for printing. This image is printed on a card or sheet of heat shrinkable, synthetic plastic, flexible film material.

This sheet is fabricated of poly-oriented styrene or other synthetic plastic, thermally sensitive film material having similar shrink characteristics, such that when the sheet is heated to an elevated temperature for a predetermined period, the sheet then proceeds to shrink uniformly in all directions, and at the same time thicken. Hence when an image is printed on the sheet in a scale appropriate to the dimensions of the sheet, the image on the shrunken sheet is reduced in scale but is otherwise free of distortion to create on a relatively thick and rigid plastic substrate a miniature of the selected individual.

The system includes a video camera 11 which is trained on individual 10 to be miniaturized. The output signal from the video camera is fed to a high-resolution black and white TV monitor 12 on whose screen 13 is presented an image 14 of the individual. Monitor 12 is provided with controls 15 which makes it possible to adjust the scale of the image and its intensity and contrast so that the image can be composed by the user of the system.

The image 14 shown in FIG. 1 is that of the mother of the child. But it can, as previously noted, be that of any individual or animal selected by the user for miniaturization.

Associated with TV monitor 12 is a printer 16 which may be of the xerographic copy type, an ink-jet printer or any other known type of printer capable of impressing on the face of a heat shrinkable plastic film sheet 17 a black and white image 18 of the individual 14 whose image appears on TV screen 13, but in a reduced scale appropriate to the dimensions of the card. While the image on the card is in a scale smaller than the image on the screen it is still not in a miniature scale.

When the card or sheet 17 is removed from the printer, the black and white image 18 thereon is then colored by the child, using color pencils or pens for this purpose, or water-based paints applied to the sheet by a brush. The nature of the coloring material must be such that they are unaffected by the elevated temperature to which the card is later exposed.

The card 17 having the colored image thereon is then placed in a biscuit tray 19, and the tray is placed in an oven 20. This oven is preheated to a temperature of about 375° to 400° F., so that the interior atmosphere of the oven is uniformly hot before the tray is inserted in the oven.

The tray is kept in the head oven for a period of about 5 minutes, in the course of which card 17 in response to the elevated temperature proceeds to first curl and then shrink uniformly to a considerable degree, and finally flatten out to produce a miniature M.

Miniature M is taken from the tray and placed on a flat surface, a piece of cardboard or a magazine being pressed on the hot card to hold it flat while the card cools and cures, this pressure being applied for a few minutes until the miniature is at room temperature. In the course of shrinkage, the card, which is made of thin, flexible film material, thickens, for the total material of the card remains the same but is now concentrated in a substrate of much smaller dimensions.

As shown in FIG. 2, miniature M is provided with a hole 21 at its upper edge, this hole having been punched in the sheet prior to heating. A chain 22 is now threaded through the hole, so that the miniature can be suspended from the neck. Or the miniature can be attached to a key chain.

To prevent the heated sheet from sticking to the tray, the tray can be lined with aluminum foil or a Teflon sheet. And if one wishes to produce a miniature of an individual whose contours more or less conform to the outline of the image printed on the sheet, the sheet can be cut with a scissors.

In order to provide a set of play pieces each in the form of a contoured miniature of an individual, a plastic play base 23 is provided, as shown in FIGS. 3 and 4, the play base being provided with a pair of flexible, arcuate lugs 24 and 25, the spacing therebetween being sufficient to admit and clamp onto the lower edge of the contoured miniature M.

In this way, one can create, as shown in FIG. 5, a set of play pieces $P_1$, $P_2$, $P_3$ etc., each being a contoured miniature of a different individual on a stand 23. Thus one can create one set of play pieces of boys who are friends of the child who create the miniatures, and another set of girls who are also friends of the child, and play a game of checkers on a checkerboard 26 in which the boy miniatures are the black pieces, and the girl miniatures are the white pieces.

A not uncommon experience with a pre-school child is that the child does not remember his home address and telephone number. Should the child become lost, he is unable to tell a helpful adult where he lives or his telephone number, so that his parents can be called. To provide the child with an identifier, the heat-shrinkable sheet may have pre-printed thereon data entry lines above which can be written in the name, address and telephone number of the child, the sheet also having an image of the child. This data is readable in the reduced scale of the miniature which can be attached to a key chain to be carried by the child. Hence should the child become lost and be in need of assistance, he can show the miniature to a helpful adult. And, of course, an identifying miniature may be made for a pet dog or cat to be attached to a neck collar, for pets often become lost.

The invention is not limited to a black and white TV monitor and printer, for the monitor and printer may be of the color type, in which case there is no need for the user to color in the image printed on the heat shrinkage card or sheet. And instead of a TV system, a photograph may be taken of the selected individual and reproduced in an appropriate scale in a xerographic copy machine in which the heat-shrinkable sheet functions as the copy sheet.

While there have been shown and described preferred embodiments of a system for creating custom-made miniatures in accordance with the invention, it will be appreciated that many changes and modifications may be made therein without, however, departing from the essential spirit thereof.

I claim:

1. A system for converting a printable sheet of heat-shrinkable, synthetic plastic film material having predetermined dimensions into a custom-made miniature of a selected individual, said system comprising:

(a) means to create a two-dimensional image of said individual;

(b) means to print said image on said sheet in a scale appropriate to the dimensions of the sheet;

(c) means to subject said sheet to an elevated temperature for a period sufficient to cause said sheet to shrink and thicken to produce a substrate on which is printed a reduced scale image of said individual; and (d) means to cool and cure said substrate to create said miniature.

2. A system as set forth in claim 1, wherein said sheet is formed of poly-oriented styrene.

3. A system as set forth in claim 1, wherein said means to form said image is a video camera trained on said individual, and a TV monitor to which said video camera is coupled, and on whose screen appears said image.

4. A system as set forth in claim 3, wherein said monitor is a black and white monitor, and the resultant black and white image printed on said sheet may then be colored by a user of the system before the sheet is shrunk.

5. A system as set forth in claim 1, wherein said means to subject said sheet to an elevated temperature is an oven in which is received a tray carrying said sheet.

6. A system as set forth in claim 1, in which the means to print said image is applied to said heat-shrinkable sheet which is contour cut along the outline of the image to produce a contoured sheet which is then shrunk by said means subjecting the sheet to an elevated temperature and cooled by said means to cool to produce a contoured miniature.

7. A system as set forth in claim 6, further including a stand on which the contour miniature is mounted to provide a play piece.

* * * * *